(12) United States Patent
Sano et al.

(10) Patent No.: US 8,043,677 B2
(45) Date of Patent: Oct. 25, 2011

(54) FLUROPOLYMER RESIN COATED MEMBER, A METAL MOLD FOR FORMING POLYESTER RESIN CONTAINER MADE THEREOF AND REPRODUCING METHOD OF SAID METAL MOLD

(75) Inventors: Hiroki Sano, Yokohama (JP); Yasuhiro Takasaki, Yokohama (JP); Kazuhiro Sato, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 1104 days.

(21) Appl. No.: 11/664,118

(22) PCT Filed: Sep. 29, 2005

(86) PCT No.: PCT/JP2005/018042
§ 371 (c)(1),
(2), (4) Date: Aug. 15, 2007

(87) PCT Pub. No.: WO2006/035914
PCT Pub. Date: Apr. 6, 2006

(65) Prior Publication Data
US 2008/0182102 A1    Jul. 31, 2008

(30) Foreign Application Priority Data
Sep. 30, 2004    (JP) ................................. 2004-289064

(51) Int. Cl.
*B32B 3/26* (2006.01)
*B32B 15/08* (2006.01)
*B32B 27/00* (2006.01)
*B32B 33/00* (2006.01)

(52) U.S. Cl. ........ 428/35.8; 428/142; 428/340; 428/421; 428/457

(58) Field of Classification Search ........................ None
See application file for complete search history.

(56) References Cited

U.S. PATENT DOCUMENTS
6,033,724 A * 3/2000 Molitor ......................... 427/135

FOREIGN PATENT DOCUMENTS
JP    05-023403 A    2/1993
(Continued)

OTHER PUBLICATIONS
Machine translation of JP 2002-018858 A, Jan. 2002.*

*Primary Examiner* — Ramsey Zacharia
(74) *Attorney, Agent, or Firm* — Browdy and Neimark, PLLC (57) ABSTRACT

A fluoropolymer resin coated member in which the fluoropolymer resin layer has been improved in wear resistance and peeling resistance. When the coated member is used to form a mold for polyester container molding, part of a polyester resin or an oligomer ingredient or additive contained in the polyester resin is prevented from depositing on the mold surface. And a polyester container with excellent luster and transparency can be manufactured. The fluoropolymer resin coated member (1) comprise a foundation (10) and a fluoropolymer resin layer (20) formed thereon, the foundation (10) having a surface roughness of 2 to 10 degree in Root-mean-square slope of profile, the amount of the fluoropolymer resin of the fluoropolymer resin layer (20) being 0.5-8.5 g/m², and the surface roughness of the fluoropolymer resin layer being 5 degree or less in Root-mean-square slope of profile Δq2. The metal mold for forming polyester resin container can be reproduced in such a manner that amorphous fluoropolymer resin layer 20 applied on the hard surface of foundation 10 of the metal mold for forming polyester resin container is removed by abrasive to obtain mirror finish, then a new amorphous fluoropolymer resin layer 20 is applied on the surface of foundation 10.

8 Claims, 4 Drawing Sheets

FOREIGN PATENT DOCUMENTS

| | | |
|---|---|---|
| JP | 08-090586 A | 4/1996 |
| JP | 2002-018858 A | 1/2002 |
| JP | 2002-292657 A | 10/2002 |
| JP | 2004-082461 A | 3/2004 |

* cited by examiner

FLUROPOLYMER RESIN COATED MEMBER, A METAL MOLD FOR FORMING POLYESTER RESIN CONTAINER MADE THEREOF AND REPRODUCING METHOD OF SAID METAL MOLD

TECHNICAL FIELD

The present invention relates to a resin forming member for forming resin container used for beverage, food and toiletry and so on. In particular, the present invention relates to a fluoropolymer resin coated member for forming polyester resin container in shape of bottle, cup or tray capable of filling contents such as tea, water, juice, alcohol and coffee and so on, to a metal mold for the container using the member, and to a reproducing method of the metal mold.

BACKGROUND ART

A container made of polyester resin such as PET (polyethylene terephthalate) resin is typically a bottle, a cup or a tray, and has excellent transparency, impact resistance, gas impermeability and so on. It is produced and used in a lot of kinds and shapes, thus the production of it is one of the most important in industrial field. For example, a bottle included in polyester resin containers is produced as follows; heating a preform prepared by injection molding to a temperature range of 100 to 130° C. which is higher than the glass transition temperature (Tg); and biaxial stretch blow molding the preform in a metal mold for forming shortly thereafter.

Also, a heat resistant polyester resin bottle used for hot packing is provided with heat resistance by heating a metal mold for forming to a crystallizing temperature range of polyester resin, that is 100 to 180° C., in order to heat set the bottle in a high temperature range after the biaxial stretch blow molding.

On the other hand, cup or tray included in polyester resin container is made of a polyester sheet by vacuum forming or pressure forming in a female mold (metal mold for forming) having a same shape as the container, drawing by the female mold and a plug, or made of a preform by biaxial stretch blow molding by using a plug and a female mold in the same manner as the production of above-mentioned bottle.

Also, a heat resistant cup or tray used for hot packing is provided with heat resistance by heating a female mold and a plug to a crystallizing temperature range of polyester resin for forming as with the case of the bottle.

Since a metal mold for forming such polyester resin containers needs to have releasability with respect to polyester resin during forming as well as smoothness of inner surface of the metal mold for the purpose of providing the product with surface luster and transparency, a mold made of stainless steel or aluminum alloy, the surface thereof being mirror finished after the inner surface thereof being machined has been used as a metal mold for forming.

Also, in the case of forming a heat resistant polyester resin container, there has been a problem that a part of polyester resin on the surface of container, oligomer ingredient in the polyester resin or additive adheres and builds up on the surface of metal mold, and then the configuration of the buildup transfers onto the surface of the polyester resin container after forming, which adhersely effects luster and transparency of the container, so the metal mold has to be cleaned in a short period of time.

The adhered oligomer diffuses to the surface of container and concentrates thereon during forming even if oligomer amount in the resin is small enough, and it moves on the mold surface to produce a crystalline buildup, which is known as a peculiar phenomenon in polyester resin container.

In addition, as the aforementioned mirror finished metal mold for forming tends to have poor releasability, the surface of metal mold for forming is roughened, which possibly produces a container with a roughened surface.

In particular, in case of forming a heat resistant polyester resin container, the metal mold is heated to a temperature range of 100 to 180° C. to heat set the container for the purpose of providing heat resistance. Therefore, following problems are caused; viscosity of the polyester resin increases, releasing force from the metal mold surface increases, and containers tend to be distorted when they are released from the metal mold.

The aforementioned critical problems in this industrial field should be solved for the reason that they deteriorate the production efficiency and the product quality in the high velocity mass production of polyester resin container in the present time.

Meanwhile, patent document 1 and 2 propose a metal mold for forming plastic of which surface is coated with fluoropolymer resin to form a releasing membrane. Patent document 3 proposes adhering a foundation membrane on a metal mold for forming and a releasing membrane consisting of an amorphous fluoropolymer resin coating on the foundation membrane, and removing and then reproducing the releasing membrane by cleaning and dissolving off the amorphous fluoropolymer resin coating in an inert fluoropolymer liquid, followed by coating an amorphous fluoropolymer resin dissolved in an inert fluoropolymer liquid on the releasing membrane, then drying and heating.

Applicant of the present invention also proposes a metal mold for polyester resin container of which surface is coated with a fluoropolymer resin to solve the aforementioned problems during forming polyester resin container in patent document 4 and 5.

PATENT DOCUMENT 1: Publication No. Hei4-353406
PATENT DOCUMENT 2: Publication No. Hei4-353407
PATENT DOCUMENT 3: Publication No. Hei5-245848
PATENT DOCUMENT 4: Publication No. 2002-18858
PATENT DOCUMENT 5: Publication No. 2003-393189

PROBLEMS TO BE SOLVED BY THE PRESENT INVENTION

In above patent documents 1 to 4, curing is needed to form a fluoropolymer resin membrane or to produce strength required in the fluoropolymer resin coating at the coating fluoropolymer resin. In case that aluminum is used as a substrate of the metal mold in order to obtain light weight, when curing is made at a temperature required for melting the fluoropolymer resin, for example on the condition of heating temperature of 320° C., there has been a problem in the curing process that the substrate of metal mold softens to cause cracks in the metal of metal mold, changes in the dimension of the metal mold or scratches on the mold surface during the usage of it, which shortens the life of metal mold.

In order to solve these problems, as described in the above patent document 5, applicant of the present invention proposed a fluoropolymer resin coated member having a heat insulating layer on a metal substrate and a fluoropolymer resin layer applied on the heat insulating layer, in which thermal conductivity of the heat insulating layer is smaller than that of the metal substrate, a metal mold for polyester resin container using the coated member, and a manufacturing method thereof. However, applicant of the present invention made an additional investigation after proposing the patent document 5. As a result, applicant found that there are problems to be solved in wear resistance and peeling resistance of the fluoropolymer resin layer, or luster and transparency of the polyester resin container during manufacturing, even though adhering and building up of a portion of polyester resin originated from polyester resin container, oligomer ingredient and additive in polyester resin could be prevented.

For example, at the manufacturing bottles made from polyester resin using a metal mold provided with a fluoropolymer resin layer, the fluoropolymer resin layer on the metal mold surface wears and the resin membrane becomes thinner or a portion of it is lost after manufacturing some hundred thousand to a million bottles per one mold. As a result, the resin originated from the formed containers tends to adhere on the metal mold, and removing of the adhered resin by cleaning tends to be hard, which causes a smaller interval for cleaning and deterioration of transparency (haze) of the manufactured bottles. In this case, when the transparency of bottle deteriorates and it is decided that use of the mold exceeds a limit at the manufacturing station, the metal mold is regarded as "after-use" and processed into reproduction treatments.

In addition, in the reproducing method proposed in the patent document 3, since the amorphous fluoropolymer resin is cleaned and dissolved off in a fluoro inert liquid, it is impossible to totally remove the amorphous fluoropolymer resin coating and to make mirror finished surface for the substrate, or it takes longer time and effort to make.

With respect to solving these problems, applicant of the present invention found that it is preferable to control surface roughness of the substrate, surface roughness and coating amount of the fluoropolymer resin layer applied on the substrate more severely in respect of ensuring wear resistance, peeling resistance of the fluoropolymer resin, luster and transparency of the container during manufacturing.

Applicant of the present invention also found that it is preferable to specify a foundation of the metal mold for forming polyester resin container, a fluoropolymer resin layer and polishing condition in respect of reproducing a metal mold for forming polyester resin container.

Therefore, purpose of the present invention is to provide a fluoropolymer resin coated member which facilitates to ensure wear resistance and peeling resistance of the fluoropolymer resin layer, luster and transparency of the polyester resin container, a metal mold for forming polyester resin container using the coated member, and reproducing method of the metal mold.

SUMMARY OF THE INVENTION

The present invention provides a fluoropolymer resin coated member having a fluoropolymer resin layer applied on a foundation, wherein the surface roughness of the foundation is 2 to 10 degree in Root-mean-square slope of profile $\Delta q1$, the fluoropolymer resin coating amount is 0.5 to 8.5 $g/m^2$, and the surface roughness of the fluoropolymer resin layer is 5 degree or less in Root-mean-square slope of profile $\Delta q2$.

Here, the Root-mean-square slope of profile $\Delta q$ (unit; degree) is represented by $\Delta q = \tan-1 R\Delta q$, and $R\Delta q$ is a parameter of surface roughness and represents root Root-mean-square slope of profile of section curb (unit; tangent, JIS 0601:2001).

It is preferable that a fluoropolymer resin coated member of the present invention has any of the following characteristics;
1. Surface hardness of the foundation is Hv 250 to 2000.
2. The foundation comprises a substrate and a hard layer, and a layer of fluoropolymer resin is applied on the hard layer.
3. The fluoropolymer resin comprises an amorphous fluoropolymer resin.
4. A metal mold for forming polyester resin container comprises the fluoropolymer resin coated member.

Further, according to the reproducing method of metal mold for forming polyester resin container of the present invention, an amorphous fluoropolymer resin layer is applied onto a hard surface of foundation of the metal mold for forming polyester resin container is removed by abrasion to obtain a mirror finished surface, then a new amorphous fluoropolymer resin layer is applied on surface of the foundation.

It is preferable that the reproducing method of metal mold for forming polyester resin container of the present invention has any of the following characteristics;
1. Surface roughness of the foundation is 2 to 10 degree in Root-mean-square slope of profile $\Delta q1$, coating amount is 0.5 to 8.5 $g/m^2$, and surface roughness is less than 5 degree or less in Root-mean-square slope of profile $\Delta q2$ of the new fluoropolymer resin layer.
2. Surface hardness of the foundation is Hv 250 to 2000.
3. The foundation comprises a metal substrate and a hard layer.
4. The amorphous fluoropolymer resin layer is removed by using abrasive of which elastic core surface is covered with abrasive grain.

DETAILED DESCRIPTION OF THE INVENTION

According to the present invention, wear resistance and peeling resistance of fluoropolymer resin layer of a fluoropolymer resin coated member are improved. And, when the coated member is used in a metal mold for forming polyester resin container, the polyester resin containers with excellent luster and transparency can be formed. Further, adhering and building up of a portion of the polyester resin, oligomer ingredient or additive in the polyester resin can be prevented.

In addition, reproduction of the metal mold for forming polyester resin container can remarkably be facilitated. And after the reproduction, wear resistance and peeling resistance of fluoropolymer resin layer of the fluoropolymer resin coated member are improved, polyester resin containers with excellent luster and transparency can be formed as well as adhering and building up of a portion of the polyester resin, oligomer ingredient or additive in the polyester resin can be prevented.

BEST MODE OF THE PRESENT INVENTION

Hereinafter, the best mode of the present invention will be explained according to figures.

Figure 1:
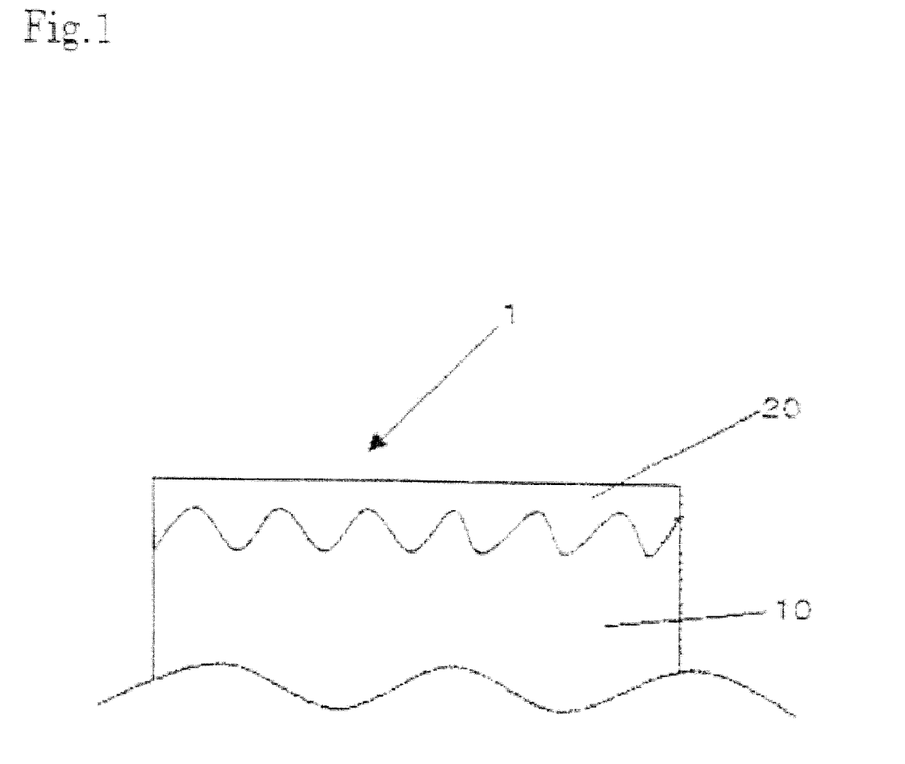
FIG. 1 is a cross sectional view of a fluoropolymer resin coated member of the present invention.

FIG. 1 is a cross sectional view which shows a cross section of a fluoropolymer resin coated member of the present invention.

As shown in FIG. 1, fluoropolymer resin coated member 1 of the present invention comprises foundation 10 and fluoropolymer resin layer 20 which covers the surface of foundation 10.

The surface of foundation 10 covered with fluoropolymer resin layer 20 is rough finished by machining such as shot blasting or sand blasting so as to have surface roughness of 2 to 10 degrees, preferably 4 to 7 degrees in Root-mean-square slope of profile $\Delta q1$. When the Root-mean-square slope of profile of surface roughness is less than 2 degrees, retention of fluoropolymer resin layer 20 is reduced. On the other hand, when it exceeds 10 degrees, it is hard to obtain surface flatness of fluoropolymer resin layer 20 applied on foundation 10.

Aluminum alloy is preferably used as foundation 10 to be provided with fluoropolymer resin layer because of its light weight and machineability. Also, magnesium alloy, titanium alloy etc. is applicable.

It is also preferable to use a material with hardness of Hv 250 to 2000, preferably 500 to 2000, as foundation 10. It is preferable because a material with these hardness values prevents softening of substrate 11 (see FIG. 2) of foundation 10 at the coating of a fluoropolymer resin, change in the dimension, surface scratching, and breakage, scratching or distortion of the metal mold when it is used as a metal mold for forming polyester resin container. It is also preferable because removing of the fluoropolymer resin layer and mirror finishing of the foundation provided with a new fluoropolymer resin layer by using abrasive can be facilitated during reproduction of the metal mold.

By the way, hardness exceeding Hv 2000 is not preferable because the metal mold for forming polyester resin container is hard to be machined into a predetermined configuration. Such as hard aluminum, stainless steel, or hardened steel can be used as a foundation 10.

The load (Hv) charged at the measuring Vickers hardness of metal substrate is usually 300 g. In case of measuring a thin object such as a film, load of 25 g or so is used because hardness of the substrate surface under the film that is pierced through is measured when bigger load is used.

On the other hand, coating amount of fluoropolymer resin layer 20 applied on the surface of foundation 10 is preferably 0.5 to 8.5 $g/m^2$, more preferably 1.5 to 3 $g/m^2$. When the coating amount is less than 0.5 $g/m^2$, uniformity of the coating on foundation 10 deteriorates and coating defects increase. On the other hand, when it exceeds 8.5 $g/m^2$, surface roughening originated from creep deformation during forming increases, which reduces luster and transparency of polyester resin containers after forming and uneconomically increases processing cost.

And further, as fluoropolymer resin layer 20 should be featured not to adhere to polyester resin, oligomer or additive. Also, surface smoothness which ensures excellent luster and transparency of polyester resin containers after forming is needed. The surface is heat melted after spraying, or if necessary, smoothly finished by buff machining so as to make the surface roughness of 5 degrees or less, preferably 0.5 to 3 degrees in Root-mean-square slope of profile $\Delta q2$. When the Root-mean-square slope of profile $\Delta q2$ is less than 0.5 degree, it is substantially hard to be smoothly finished and takes long time for polishing. On the other hand, when it exceeds 5 degrees, mirror finish of the surface of fluoropolymer resin layer 20 is inferior, which possibly causes blur on the polyester resin containers.

In this way, particularly in case of adapting fluoropolymer resin coated member 1 to a metal mold for forming polyester resin container, smooth finishing of surface of fluoropolymer resin layer 20 can prevent adhering of polyester resin, oligomer or additive and deliver manufacturing polyester resin containers with excellent luster and transparency.

By the way, it is preferable to make a relationship between $\Delta q1$ and $\Delta q2$ to be $\Delta q1 > \Delta q2$ with respect to retaining strength of the coating itself against cohesive failure and peeling resistance between the coating and the foundation.

Any of known fluoropolymer resins such as polytetrafluoroethylene, tetrafluoroethylene/hexafluoropropylene copolymer, tetrafluoroethylene/perfluoroalkylvinylether copolymer and those modified by epoxy resin, acryl resin and block acryl resin, and tetrafluoroethylene/perfluoro(2,2-dimethyl 1,3-dioxol) copolymer and so on can be used as a fluoropolymer resin for fluoropolymer resin layer 20.

In these fluoropolymer resins, an amorphous fluoropolymer resin such as tetrafluoroethylene/perfluoro(2,2-dimethyl 1,3-dioxol) copolymer is particularly preferable because control of coating amount and surface roughness in Root-mean-square slope of profile $\Delta q2$ by heat melting can easily be performed. In addition, amorphous fluoropolymer resin can be dissolved in fluoro solvent so that it can be thinly coated in solution.

Figure 2:
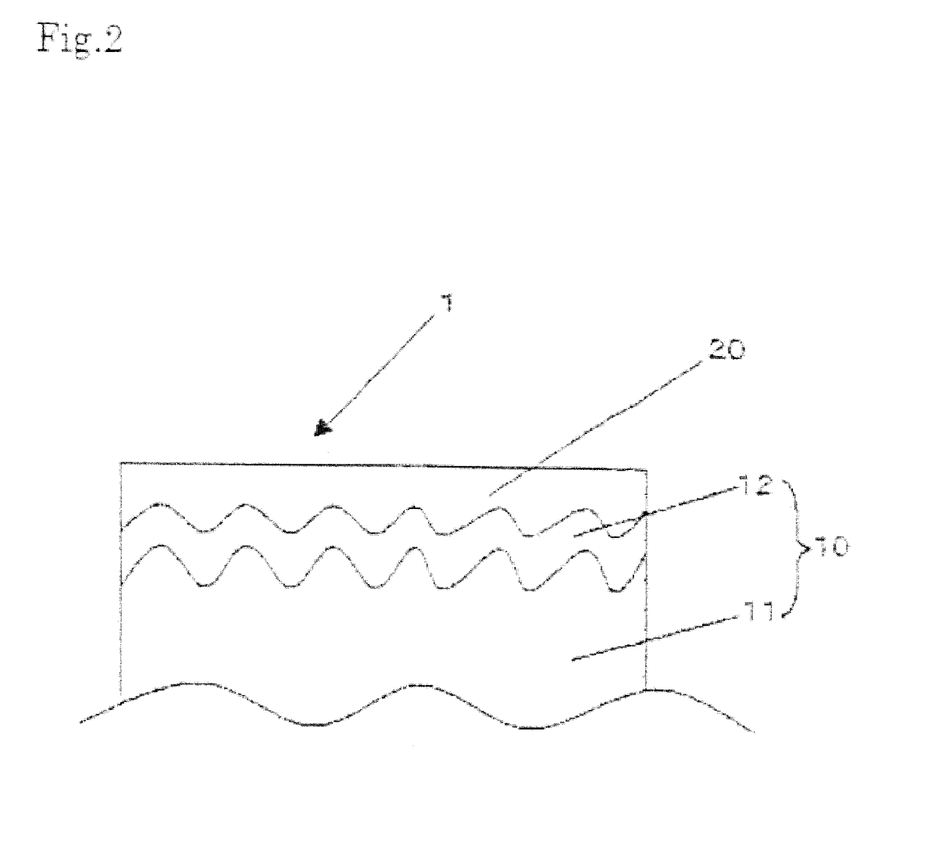
FIG. 2 is a cross sectional view of another fluoropolymer resin coated member of the present invention.

FIG. 2 is a cross sectional view which shows a section structure of another fluoropolymer resin coated member of the present invention.

In fluoropolymer resin coated member 1 shown in FIG. 2, foundation 10 comprises substrate 11 and hard layer 12. The substrate 11 is composed of aluminum alloy and formed into the prescribed configuration by means such as machining, then hard layer 12 on the substrate 11 and the fluoropolymer resin layer 20 on the hard layer 12 is provided sequentially.

In this process, at first the hard layer 12 is formed on the substrate 11 of which surface is rough finished by using machining such as shot blasting or sand blasting. Then, surface of hard layer 12 to be provided with fluoropolymer resin layer 20 is fine finished by polishing such as buff polishing. After that, it is rough finished by machining such as shot blasting or sand blasting so as to obtain surface roughness of 2 to 10 degree, preferably 4 to 7 degree in Root-mean-square slope of profile $\Delta q1$.

Similarly, the surface of the fluoropolymer resin layer 20 is smoothly finished by heat melting or buff polishing after spray coating so as to obtain surface roughness of 5 degrees or less, preferably 0.5 to 3 degrees in Root-mean-square slope of profile $\Delta q2$.

The hardness of hard layer 12 is preferably 250 to 2000 in Vickers hardness (Hv), more preferably 500 to 2000, which prevents softening of the substrate 11 in the foundation 10, change in dimension, and surface damage at the coating of fluoropolymer resin. It also prevents breakage, scratching and distortion of the metal mold at the forming containers, and also facilitates removing the fluoropolymer resin layer by using machining agent during reproduction of the metal mold, and mirror finishing of the foundation to be provided with a new fluoropolymer resin layer.

Hard layer 12 is harder than substrate 11 and comprises alloy, metal oxide or ceramic. An alloy for hard layer 12 can be, for example, nickel alloy such as iron-nickel alloy, nickel-chromium alloy, nickel-phosphorus alloy or nickel-boron alloy, or iron alloy such as iron-chromium alloy or iron-nickel-chromium alloy.

As a metal oxide, aluminum oxide, chromium oxide, iron oxide or nickel oxide can be used.

As a ceramic, metal nitride such as titanium nitride or chromium nitride, or metal carbide such as chromium carbide, can be used, and one of these ceramics, a combination of plural of these ceramics, or a combination with other ceramic can also be used.

In case that aluminum alloy is used as substrate 11, nickel-phosphorus alloy is preferably formed as hard layer by using plating method because it excellently adheres to substrate 11.

In addition, the thickness of hard layer 12 is preferably 2 to 100 μm. When the thickness is less than 2 μm, substrate 11 in foundation 10 is possibly exposed during mirror finishing of hard layer 12 to be provided with a new fluoropolymer resin layer. On the other hand, when it exceeds 100 μm, it is too thick to cause cracks in hard layer 12 and economically unfavorable.

As well, as not showing in figure, an adhering layer may be provided between foundation 10 and fluoropolymer resin layer 20. The adhering layer improves adhering effect between foundation 10 and fluoropolymer resin layer 20. Metal oxide, metal hydroxide or silane coupling agent can be used as the adhering layer.

The fluoropolymer resin coated member of the present invention can be used as a metal mold for forming polyester resin container, particularly used for biaxial stretch blow molding for polyester resin container.

Figure 3:
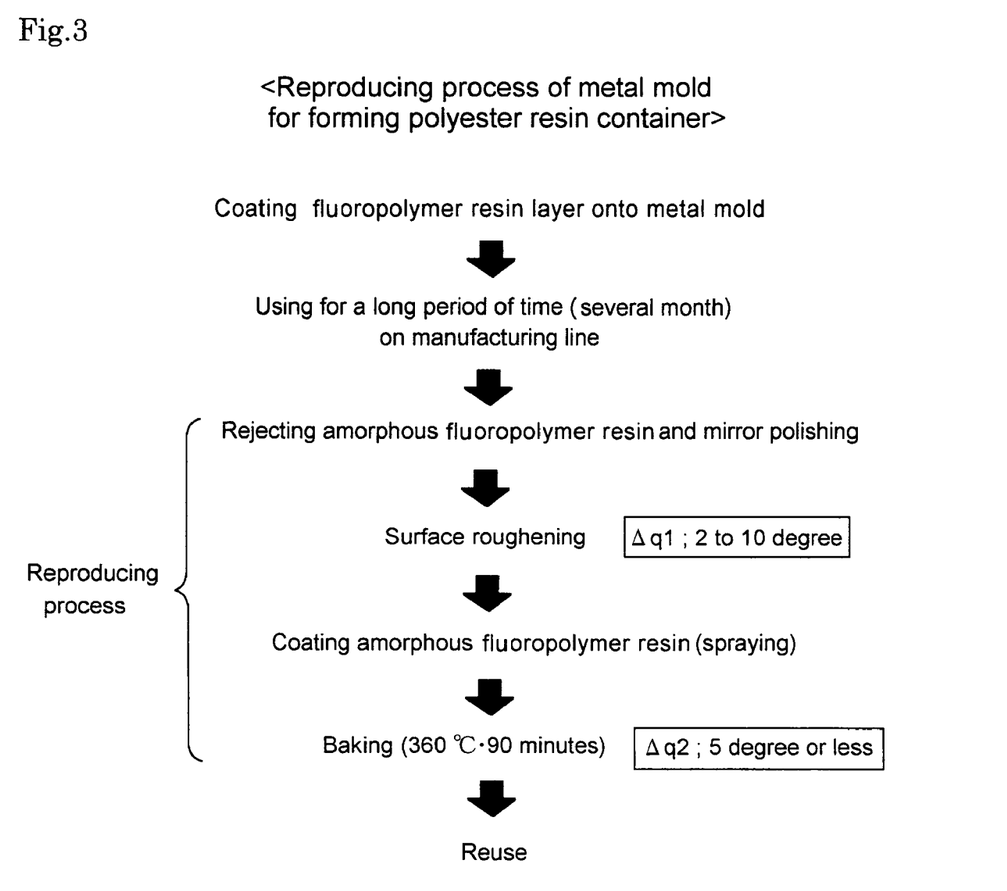
FIG. 3 is a reference drawing which shows reproducing method of a metal mold for forming polyester resin container of the present invention.

FIG. 3 shows reproducing method of the metal mold for forming polyester resin container of the present invention. At first, as shown in the reproducing process, the amorphous fluoropolymer resin layer applied on the hard surface of the metal mold after use is removed, and the hard surface is mirror polished with abrasive. The reason is that the fluoropolymer resin layer as well as the fluoropolymer resin on the rough surface portion of foundation should surely be removed when the metal mold is reproduced. For this reason, the rough surface of foundation is mirror finished by using abrasive.

At this moment, the amorphous fluoropolymer resin layer and the hard surface of foundation can facilitate total removing of the fluoropolymer resin layer, and mirror polishing on the surface of the foundation by using abrasive during mirror finishing.

Figure 4:
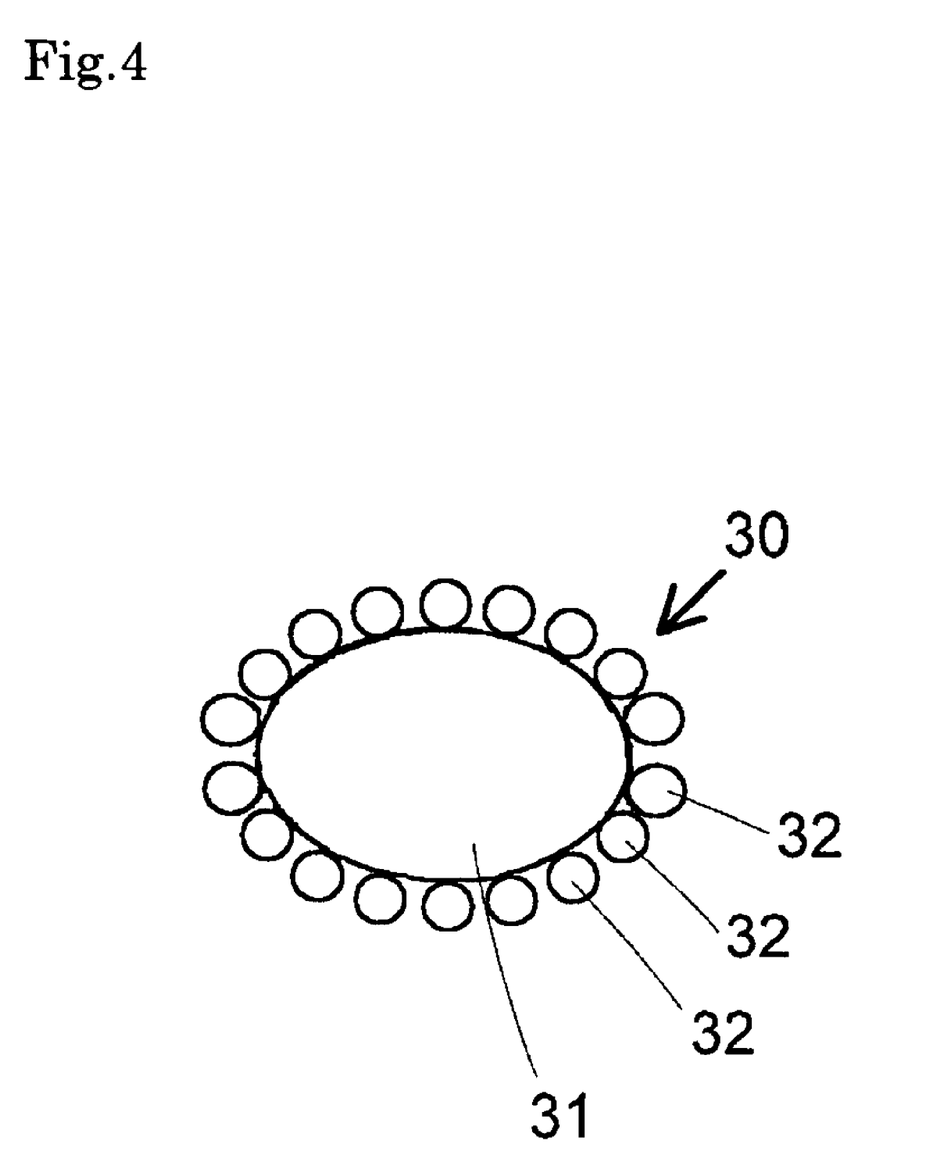
FIG. 4 is a cross sectional view showing an example of abrasive.

When the fluoropolymer resin layer is totally removed and the foundation surface is mirror finished, as shown in FIG. 4, abrasive 30 comprising elastic core 31 having a particle diameter of 0.3 to 0.6 mm of which surface is covered with abrasive grain 32, such as SP-30G or SP-FLLO produced by TOYO KENMAZAI KOGYO Co., Ltd, is preferably used because mirror finishing is obtained in a short time. Elastic core 31 comprising abrasive 30 can be made of a elastic material such as gum or plastics, and abrasive grain 32 provided on elastic core 31 can be made of a grain of hard material such as silicon carbide or alumina.

The hardness of foundation surface is preferably Hv 250 to 2000, more preferably Hv 500 to 2000 in order to obtain the effect of the abrasive sufficiently.

In the example of fluoropolymer resin coated member shown in FIG. 1, foundation 10 is preferably formed of hard aluminum, stainless steel, or hardened steel. And, in the example of fluoropolymer resin coated member shown in FIG. 2, foundation 10 preferably comprises substrate 11 formed of an aluminum alloy and so on, and hard layer 12 formed of a nickel-phosphorus alloy and so on.

In the metal mold after reproduced, the surface roughness of foundation, of which amorphous fluoropolymer resin layer is removed, is preferably 2 to 10 degrees, particularly 4 to 7 degrees in Root-mean-square slope of profile $\Delta q1$ in the same manner as the fluoropolymer resin coated member or the metal mold for forming polyester resin container. Also in the new amorphous fluoropolymer resin layer, coating amount is preferably 0.5 to 8.5 g/m$^2$, particularly 1.5 to 3.0 g/m$^2$, and surface roughness is preferably 5 degree or less, particularly 0.5 to 3 degree in Root-mean-square slope of profile $\Delta q2$, wherein $\Delta q1 > \Delta q2$.

In the following embodiment, the case of a metal mold for a biaxial stretch blow molding polyester resin bottle will be explained.

EMBODIMENT

[Measurement]
1. Surface Roughness in Root-Mean-Square Slope of Profile $\Delta q$ Root-mean-square slope of profile $\Delta q1$ and $\Delta q2$ were measured on the condition of cut-off: 0.8 mm, scanning rate: 0.3 mm/s, measuring length: 4 mm by using a surface roughness measuring apparatus SURFCOM 570 A produced by Tokyo Seimitsu Co., Ltd.

2. Coating Amount of Fluoropolymer Resin Layer

The intensity of fluoropolymer resin layer was measured in X-ray fluorescence method by using X-ray fluorescent analyzer ZSX 100e produced by Rigaku Co., Ltd, then the coating amount was determined by calibration of intensity based on the calibration line prepared from predetermined standard samples.

3. Hardness

The hardness was measured by using a harness tester MVK-G3 produced by AKASHI Co., Ltd, with a load of 300 g for of foundation 10, and with a load of 25 g for the hard layer 12.

[Evaluation]
1. Strength (Adhesion) of Fluoropolymer Resin Layer

A disk-like sample having diameter of 30 mm, and thickness of 6 mm was attached to a rotating holder and rotated at a line speed of 3.7 m/min, then a glass rod with a tip having a spherical radius of 2.25 mm was pressed to the sample surface with pressing force of 0.01 MPa (Pin on disk method). After 10 minutes, peeling degree of the resin layer was evaluated based on the following standards;
○: Peeling was not observed.
X: Peeling was observed.

2. Appearance Luster and Transparency of Polyester Resin Bottle
(1) Appearance Luster and Transparency of Bottle Produced by Roughned Top Surface of Metal Mold 20 bottles were picked out 5 minutes after biaxial stretch blow molding started, then haze value (blur degree) was measured by using haze meter HGM-2K produced by Suga Test Instruments Co., Ltd, and then evaluation was made based on the following 2 level standards;
○: haze (mean value) is less than 10% (luster is good).
X: haze (mean value) is 10% or more (luster is poor).

(2) Appearance Luster and Transparency of Bottle Produced by Adhered Polyester Resin to Metal Mold 20 bottles were picked out 10 days after biaxial stretch blow molding started, then haze value (blur degree) was measured in the same manner as (1).
○: haze (mean value) is less than 10% (luster is good).
X: haze (mean value) is 10% or more (luster is poor)

Example 1

1. Production of a Metal Mold for Biaxial Stretch Blow Molding

Aluminum alloy 7075-T651 (hardness: Hv (300 g): 190) was machined as the foundation of metal mold and made into a metal mold (split pattern) for forming polyester resin bottle (diameter: 65 mm, height without spout: 185 mm, capacity: 500 ml) having a cylindrical cross section. After that, surface of the metal mold was buff polished for fine finish machining, then rough finished by using shot blasting in which silicon carbide grains having diameter of several to several tens μm were shot in a few second under the loading pressure of 0.1 MPa, so as to obtain surface roughness of 10 degree in Root-mean-square slope of profile $\Delta q1$.
(2) Forming of Fluoropolymer Resin Layer The metal mold was cleaned in alcohol. Then, amorphous fluoropolymer resin AF2400 with glass transition temperature of 240° C. produced by DuPont Co., Ltd was dissolved into "Fluorinert FC77" produced by 3M Co., Ltd so as to make a solvent having concentration of 0.6 weight/volume %. The solvent was sprayed onto the metal mold surface, and then thus sprayed metal mold was baked in an electric oven for 30 minutes at 320° C. to melt the fluoropolymer resin layer so that the metal mold had a surface with a fluoropolymer resin layer having coating amount of 8.5 g/m$^2$, and surface roughness of 5 degree in Root-mean-square slope of profile $\Delta q2$. In addition, hardness of the foundation was Hv (300 g) 90.

2. Forming Polyester Resin Bottle

A injection molded preform with bottom having diameter of 25 mm and height of 100 mm including spout made from polyester resin RT543CTHP produced by JAPAN UNIPET Co., Ltd was heated to 180° C. so as to crystallize the spout of preform, then heated 110° C., and then formed into a polyester resin bottle by biaxial stretch blow molding in the fluoropolymer resin coated metal mold on the following conditions; temperature of the metal mold: 150° C., preblowing pressure: 1 to 1.7 MPa, blowing pressure: 3.5 MPa, biaxial stretch in circumferential direction: 3.5 times.

After the forming polyester resin bottles, the strength (adhesion) of the fluoropolymer resin layer of the fluoropolymer resin coated metal mold and the adhesion of resin component to the metal mold after biaxial stretch blow molding (appearance luster and transparency of bottle) were evaluated.

Example 2

Quenched and tempered 13Cr—Mo Stainless steel HPM 38 produced by Hitachi Metals Co., Ltd having hardness of Hv (300 g) 550 was used as the foundation of metal mold and was rough machined so as to make surface roughness of 6 degree in Root-mean-square slope of profile $\Delta q1$. Then fluoropolymer resin layer was formed on the foundation of the metal mold by spraying solution containing fluoropolymer resin in the concentration of 0.6 weight/volume % on the metal mold surface, and heating sprayed metal mold in an electric oven for 30 minutes at 340° C. to melt the fluoropolymer resin layer. The metal mold had a surface with a fluoropolymer resin layer having coating amount of 5 g/m², and surface roughness of 3 degree in Root-mean-square slope of profile $\Delta q2$. The other conditions were same as those of Example 1. The obtained fluoropolymer resin coated metal mold and polyester resin bottles were evaluated under the same conditions of Example 1. The hardness of foundation did not change before or after heating the resin layer.

Example 3

A metal mold was manufactured as follows: The surface of aluminum alloy 7075-T651 was machined, and a hard layer having thickness of 20 μm and hardness of Hv (25 g) 600 which comprise nickel-phosphorus alloy plating by electroless plating was formed on it to create a foundation of metal mold. Then the hard layer was buff polished for fine finish machining, and rough finished by using shot blasting to make surface roughness of 2 degree in Root-mean-square slope of profile $\Delta q1$. The other conditions for manufacturing the metal mold were same as those of Example 1.

Next, a fluoropolymer resin coated metal mold and polyester resin bottles were manufactured as follows: The fluoropolymer resin layer was formed on the surface of the metal mold by spraying solution containing fluoropolymer resin in the concentration of 0.6 weight/volume %. Then the thus sprayed metal mold was heated in an electric oven for 1.5 hours at 360° C. to melt the fluoropolymer resin layer so that the metal mold had a surface with a fluoropolymer resin layer having coating amount of 0.5 g/m², and surface roughness of 0.5 degree in Root-mean-square slope of profile $\Delta q2$. After that polyester resin bottles were formed by using the thus manufactured fluoropolymer resin coated metal mold. The other conditions in manufacturing the fluoropolymer resin coated metal mold and polyester resin bottles were same as those of Example 1. The properties were evaluated in the same manner as Example 1. The hardness of foundation was Hv (25 g) 1200 after heating the resin layer.

Comparative Example 1

The same fluoropolymer resin coated metal mold and polyester resin bottles were manufactured as those of Example 1 except that surface roughness of the foundation of fluoropolymer resin coated metal mold was 15 degree in Root-mean-square slope of profile $\Delta q1$, and evaluated under the same conditions of Example 1.

Comparative Example 2

The same fluoropolymer resin coated metal mold and polyester resin bottles were manufactured as those of Example 2 except that amount of fluoropolymer resin layer was 12 g/m², and evaluated under the same conditions of Example 2.

Comparative Example 3

The same fluoropolymer resin coated metal mold and polyester resin bottles were manufactured as those of Example 3 except that amount of fluoropolymer resin layer was 0.2 g/m², and evaluated under the same conditions of Example 3.

TABLE 1

| | | Biaxial elongation blow forming mold | | |
|---|---|---|---|---|
| | Foundation | Surface roughness of foundation ($\Delta q1$) | Coating amount of fluoropolymer resin layer (g/m²) | Surface roughness of fluoropolymer resin layer ($\Delta q2$) |
| Example 1 | Aluminum 7075-T651 | 10 degrees | 8.5 | 5 degrees |
| Example 2 | Stainless steel HPM38 | 6 degrees | 5 | 3 degrees |
| Example 3 | Aluminum/ hard layer | 2 degrees | 0.5 | 0.5 degrees |
| Comparative Example 1 | Aluminum 7075-T651 | 15 degrees | 8.5 | 5 degrees |
| Comparative Example 2 | Stainless steel HPM38 | 6 degrees | 12 | 3 degrees |
| Comparative Example 3 | Aluminum/ hard layer | 2 degrees | 0.2 | 0.5 degrees |

| | Evaluation | | |
|---|---|---|---|
| | | Appearance luster and transparency of bottle | |
| | Strength of Fluoropolymer resin layer | Luster and transparency of bottle produced by rough surface of metal mold | Luster sand transparency of bottle produced by adhered resin composition onto metal mold |
| Example 1 | ○ | ○ | ○ |
| Example 2 | ○ | ○ | ○ |

TABLE 1-continued

| | | | |
|---|---|---|---|
| Example 3 | ○ | ○ | ○ |
| Comparative Example 1 | ○ | X | ○ |
| Comparative Example 2 | X | ○ | ○ |
| Comparative Example 3 | ○ | ○ | X |

In addition, in order to confirm the possibility of reproducing the after-use fluoropolymer resin coated metal molds of Example 1 to 3, the surface of each metal mold was polished using abrasive SP-30G, SP-FLLO produced by TOYO KENMAZAI KOGYO Co., Ltd having elastic core with particle diameter of 0.3 to 0.6 mm covered with abrasive grain. In case of the metal mold of Example 1, the metal mold was not so mirror finished that it could not be reproduced because the elastic core did not favorably slide on the soft surface of foundation, which caused unevenness in the long polishing.

On the other hand, in case of fluoropolymer resin coated metal molds of Example 2 and 3, the amorphous fluoropolymer resin layer applied on the hard layer of foundation could completely be removed and be mirror finished by using the aforementioned abrasive.

After that, again the surface of foundation was shot blasted to make rough finished surface of 6 degrees (in case of Example 2) or 2 degrees (in case of Example 3) in Root-mean-square slope of profile Δq1, respectively.

Then, a new amorphous fluoropolymer resin layer having coating amount of 5 g/m² (in case of Example 2) or 0.5 g/m² (in case of Example 3) was respectively formed on the thus rough finished surface of foundation. And the amorphous fluoropolymer resin layer was processed by dissolving resin, spraying, baking and heat melting under the aforementioned conditions so as to make roughness of 3 degrees (in case of Example 2) or 0.5 degree (in case of Example 3) in Root-mean-square slope of profile Δq2, respectively.

INDUSTRIAL APPLICABILITY

The fluoropolymer resin coated member of the present invention improves wear resistance and peeling resistance. In particular, when this member is used as a metal mold for forming polyester resin container such as bottle, cup or tray composed of polyester resin, the adhesion of a portion of polyester resin, oligomer in the polyester resin or additive to the metal mold can be prevented. And, polyester resin containers having excellent luster and transparency can be formed.

In addition, the reproducing method of metal mold for forming polyester resin container of the present invention can facilitate to reproduce the metal mold. After the reproduction, when using the reproduced metal mold, the adhesion of a portion of polyester resin, oligomer in the polyester resin or additive to the metal mold can be prevented and polyester resin containers having excellent luster and transparency can be formed.

| DESCRIPTION OF NUMERICAL SYMBOLS | |
|---|---|
| 1: | fluoropolymer resin coated member |
| 10: | foundation |
| 11: | substrate |
| 12: | hard layer |
| 20: | fluoropolymer resin layer |
| 30: | abrasive |
| 31: | elastic core |
| 32: | abrasive grain |

The invention claimed is:

1. A fluoropolymer resin coated member comprising a fluoropolymer resin layer applied to a foundation, wherein a surface roughness of the foundation is 2 to 10 degrees in Root-mean-square slope of profile Δq1, a fluoropolymer resin coating amount of the fluoropolymer resin layer is 0.5 to 8.5 g/m², and a surface roughness of the fluoropolymer resin layer is 5 degrees or less in Root-mean-square slope of profile Δq2.

2. The fluoropolymer resin coated member according to claim 1, wherein a surface hardness of the foundation is Hv 250 to 2000.

3. The fluoropolymer resin coated member according to claim 1 or 2, wherein the foundation comprises a substrate and a hard layer, and the fluoropolymer resin layer is applied on the hard layer.

4. The fluoropolymer resin coated member according to claim 1, wherein the fluoropolymer resin layer is made of an amorphous fluoropolymer resin.

5. A metal mold for forming polyester resin container comprising the fluoropolymer resin coated member according to claim 1.

6. The fluoropolymer resin coated member according to claim 2, wherein the fluoropolymer resin layer is made of an amorphous fluoropolymer resin.

7. The fluoropolymer resin coated member according to claim 3, wherein the fluoropolymer resin layer is made of an amorphous fluoropolymer resin.

8. A metal mold for forming polyester resin container comprising the fluoropolymer resin coated member according to claim 2.

* * * * *